(12) United States Patent  
Lortie et al.

(10) Patent No.: US 6,553,172 B2
(45) Date of Patent: Apr. 22, 2003

(54) FIBER OPTIC CABLE ROUTING DEVICE WITH PRE-ALIGNMENT FEATURE

(75) Inventors: Andre Lortie, Aylmer (CA); Willi Lotz, Carp (CA); Mike Brown, Orleans (CA)

(73) Assignee: Ceyba Inc., Ottawa (CA)

( * ) Notice: Subject to any disclaimer, the term of this patent is extended or adjusted under 35 U.S.C. 154(b) by 52 days.

(21) Appl. No.: 09/877,758

(22) Filed: Jun. 8, 2001

(65) Prior Publication Data

US 2002/0186951 A1 Dec. 12, 2002

(51) Int. Cl.$^7$ .................................................. G02B 6/00
(52) U.S. Cl. ......................... 385/134; 385/135; 385/137
(58) Field of Search ................................ 385/134–137

(56) References Cited

U.S. PATENT DOCUMENTS

| 5,237,640 | A | | 8/1993 | Pedraza et al. ............. 385/136 |
|---|---|---|---|---|
| 5,241,617 | A | * | 8/1993 | Peacock et al. ............. 385/135 |
| 5,353,367 | A | | 10/1994 | Czosnowski et al. ....... 385/135 |
| 5,402,515 | A | | 3/1995 | Vidacovich et al. ........ 385/135 |
| 5,412,497 | A | * | 5/1995 | Kaetsu et al. ............... 359/163 |
| 5,511,144 | A | * | 4/1996 | Hawkins et al. ............ 385/135 |
| 5,640,482 | A | | 6/1997 | Barry et al. ................. 385/135 |
| 5,715,348 | A | | 2/1998 | Falkenberg et al. ........ 385/135 |
| 5,717,811 | A | | 2/1998 | Macken ....................... 385/135 |
| 5,731,546 | A | | 3/1998 | Miles et al. ................. 174/135 |
| 5,740,298 | A | | 4/1998 | Macken et al. ............. 385/135 |
| 5,740,300 | A | * | 4/1998 | Hodge ......................... 385/135 |
| 5,758,002 | A | | 5/1998 | Walters ....................... 385/134 |
| 5,778,130 | A | * | 7/1998 | Walters et al. ............. 385/134 |
| 5,946,440 | A | | 8/1999 | Puetz .......................... 385/135 |
| 6,016,252 | A | | 1/2000 | Pignolet et al. ............. 361/724 |
| 6,044,194 | A | | 3/2000 | Meyerhoefer ............... 385/134 |
| 6,102,214 | A | | 8/2000 | Mendoza ..................... 211/26 |
| 6,170,784 | B1 | | 1/2001 | MacDonald et al. .......... 248/65 |
| 6,175,079 | B1 | | 1/2001 | Johnston et al. .............. 174/50 |
| 6,181,862 | B1 | | 1/2001 | Noble et al. ................. 385/135 |
| 6,208,797 | B1 | | 3/2001 | Vanderhoof et al. ........ 385/135 |
| D440,210 | S | | 4/2001 | Larsen et al. ................. D13/99 |
| 6,256,444 | B1 | * | 7/2001 | Bechamps et al. .......... 385/134 |
| 6,388,891 | B1 | * | 5/2002 | Falkenberg et al. ......... 361/796 |
| 2001/0031124 | A1 | | 10/2001 | McGrath et al. ............. 385/134 |
| 2002/0039476 | A1 | * | 4/2002 | Sauve et al. ................. 385/134 |

FOREIGN PATENT DOCUMENTS

| EP | 644440 | 3/1995 | ............ G02B/6/00 |
|---|---|---|---|
| EP | 795935 | 9/1997 | ............ H01R/13/58 |
| WO | WO 00/72646 | 11/2000 | ............ H05K/7/00 |
| WO | WO 00/76287 | 12/2000 | ............ H05K/7/14 |

* cited by examiner

Primary Examiner—Brian Sircus
Assistant Examiner—Hae Moon Hyeon
(74) Attorney, Agent, or Firm—Harness, Dickey & Pierce, P.L.C.

(57) ABSTRACT

A fiber optic cable routing device is provided for use in a fiber optic connection unit. The fiber optic connection unit may include a pair of longitudinally extending and spaced apart frame members; and a support structure mounted between the pair of frame members and adapted for connection to a plurality of vertically oriented circuit packs. The fiber optic cable routing device is disposed below the plurality of circuit packs and mounted between the pair of frame members. The cable routing device includes a faceplate and a plurality of spaced apart separating members extending outwardly from the faceplate. The plurality of separating members define a plurality of channels therebetween for routing fiber optic cable towards the circuit packs, such that each channel provides a minimum bend radius to protect the fiber optic cable extending therethrough. The cable routing device may also include one or more guide protrusions extending outwardly from the faceplate and adapted to engage at least one of the circuit packs.

23 Claims, 4 Drawing Sheets

FIBER OPTIC CABLE ROUTING DEVICE WITH PRE-ALIGNMENT FEATURE

FIELD OF THE INVENTION

The present invention relates generally to fiber optic cable management and, more particularly, to a fiber optic cable routing device having individual cable channels and a pre-alignment feature for circuit packs.

BACKGROUND OF THE INVENTION

Telecommunication services are becoming increasingly competitive. Increasing demand to provide high-quality, high bandwidth, cost effective telecommunication services has led to the rapid deployment of fiber optic networks. Fiber optic cable management is an often overlooked component in the deployment of optical networks. Proper fiber cable management provides proper bend radius, cable routing paths, cable accessibility and physical protection of the fiber cables. Thus, proper fiber cable management has a direct impact on network reliability, performance and cost.

Therefore, it is desirable to provide a fiber optic cable routing device for use in a telecommunication equipment shelf. The cable routing device should provide a minimum bend radius to protect the fiber optic cable extending therethrough. To the extent that the cable routing device is used in conjunction with a plurality of circuit packs, it should provide individual channel for each circuit pack. In this way, circuit packs and their corresponding cable can be easily replaced and maintained within the equipment shelf. In addition, the cable routing device may also provide a pre-alignment guide to facilitate the installation of the circuit packs into the equipment shelf.

SUMMARY OF THE INVENTION

In accordance with the present invention, a fiber optic cable routing device is provided for use in a fiber optic connection unit. The fiber optic connection unit may include a pair of longitudinally extending and spaced apart frame members; and a support structure mounted between the pair of frame members and adapted for connection to a plurality of vertically oriented circuit packs. The fiber optic cable routing device is disposed below the plurality of circuit packs and mounted between the pair of frame members. The cable routing device includes a faceplate and a plurality of spaced apart separating members extending outwardly from the faceplate. The plurality of separating members define a plurality of channels therebetween for routing fiber optic cable towards the circuit packs, such that each channel provides a minimum bend radius to protect the fiber optic cable extending therethrough. In another aspect of the present invention, the cable routing device may further include one or more guide protrusions extending outwardly from the faceplate, such that each guide protrusion is adapted to engage at least one of the circuit packs.

For a more complete understanding of the invention, its objects and advantages, reference may be had to the following specification and to the accompanying drawings.

DETAILED DESCRIPTION OF THE PREFERRED EMBODIMENTS

Figure 1:
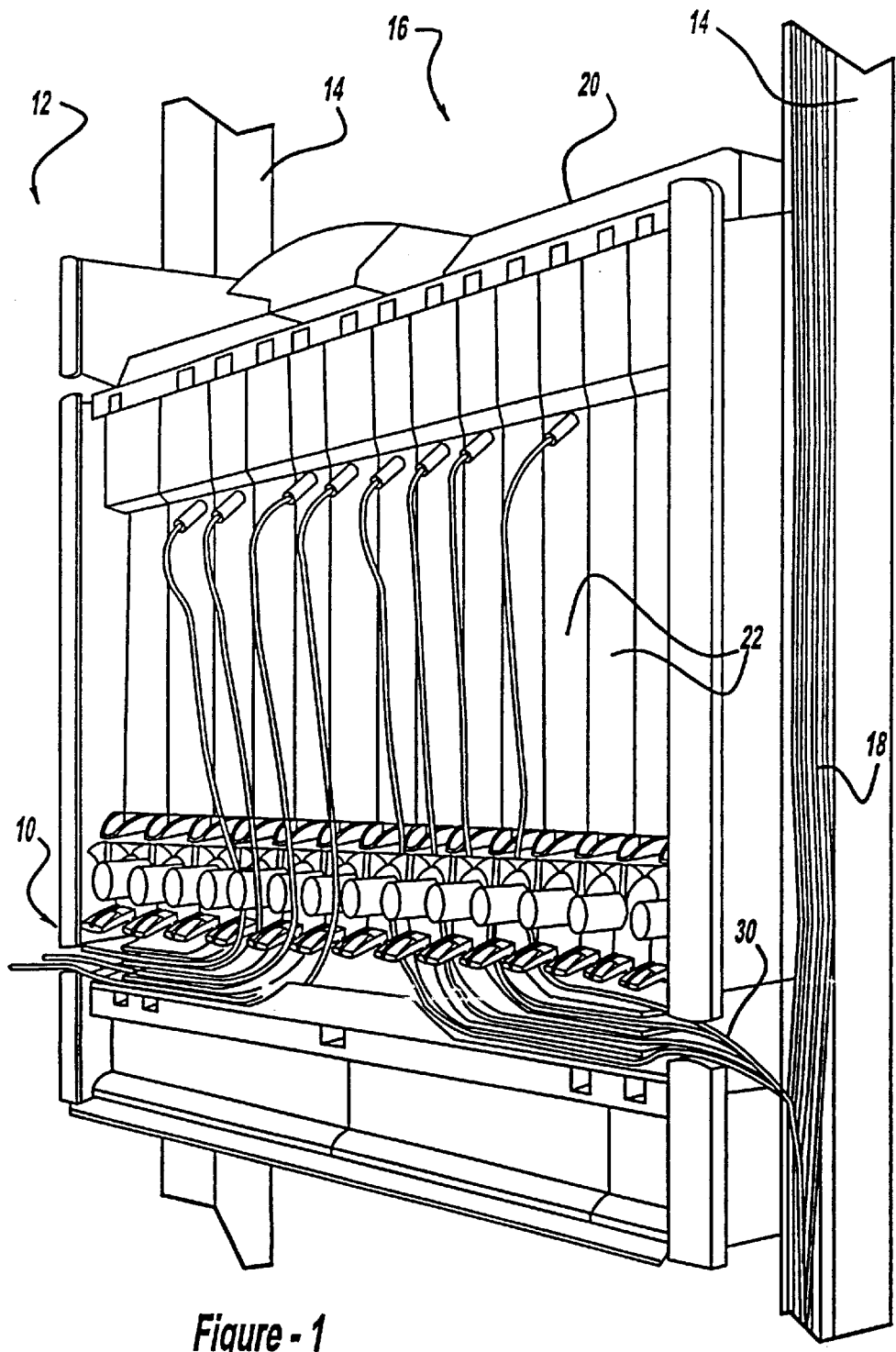
FIG. 1 is a prospective view of an exemplary fiber optic connection unit having a plurality of circuit packs and a fiber optic cable routing device in accordance with the present invention.

A fiber optic cable routing device 10 for use in an optical communication system is shown in FIG. 1. The fiber optic cable routing device 10 is mounted to an exemplary fiber optic connection unit 12. Fiber optic connection units 12 are generally used wherever connections are made to, from or between optical fibers in an optical communications system. It should be appreciated that fiber optic connection unit is used to describe various types of and/or configurations for shelf assemblies, rack assemblies, equipment bays, etc. While the following description is provided with reference to a particular fiber optic connection unit 12, it is readily understood that the broader aspects of the present invention are applicable to various types of fiber optic connection units.

The fiber optic connection unit 12, in this example, includes a pair of longitudinally extending and spaced apart frame members 14 that defines an equipment bay 16 therebetween for mounting various types of communication equipment. The frame members 14 may be interconnected to each other with one or more lateral braces (not shown) and attached to a wall or free standing on the floor.

Figure 2:
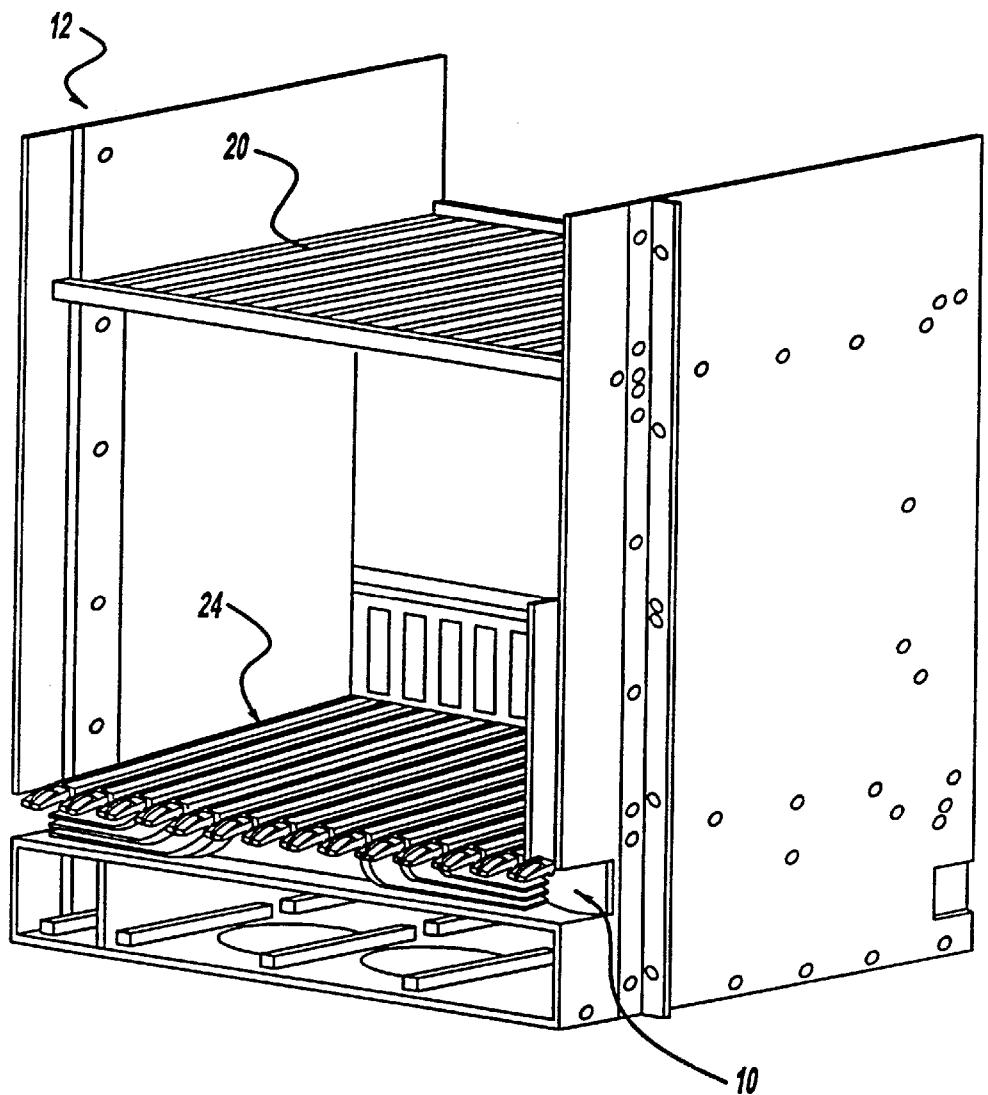
FIG. 2 is a fragmentary prospective view of the exemplary fiber optic connection unit without the plurality of circuit packs in accordance with the present invention.

In a preferred embodiment, a shelf, support rack, or other type of support structure 20 for hanging vertically aligned circuit packs is mounted between the pair of frame members 14. The shelf 20 is adapted for connection to a plurality of circuit packs 22. For instance, the shelf 20 may include a plurality of slots 24 for housing individual circuit packs, such that each slot provides an upper guide member and a lower guide member as shown in FIG. 2. In this way, a circuit pack can be slid into the upper and lower guide members and then securely connected to the shelf. However, it is also envisioned that the equipment bay can be used to mount other types of connector modules.

The fiber optic cable routing device 10 is then disposed adjacent to the circuit packs. Although the fiber optic cable routing device 10 is preferably positioned below the circuits packs and mounted to a lower portion of the support structure, this is not intended as a limitation on the broader aspects of the present invention. On the contrary, the fiber cable routing device may be suitably positioned above the circuit packs and/or mounted to one or both of the frame members. Alternatively, the fiber cable routing device 10 may be vertically orientated along side of the circuit packs. One skilled in the art will readily recognize from such discussion how to modify the fiber optic cable routing device to achieve different orientations.

Figure 3:
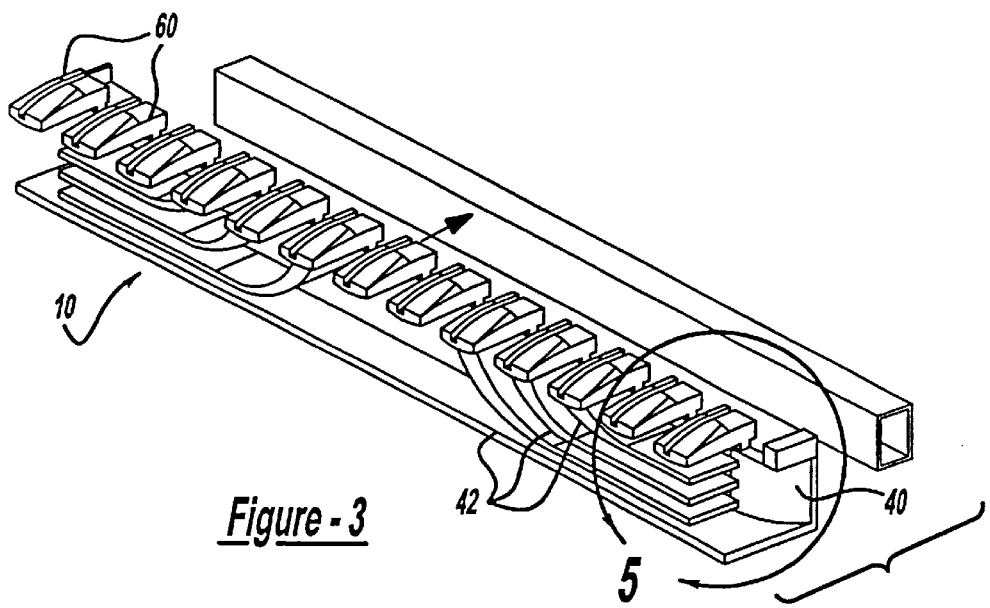
FIG. 3 is a prospective view of a first preferred embodiment of the fiber optic cable routing device of the present invention.
Figure 4:
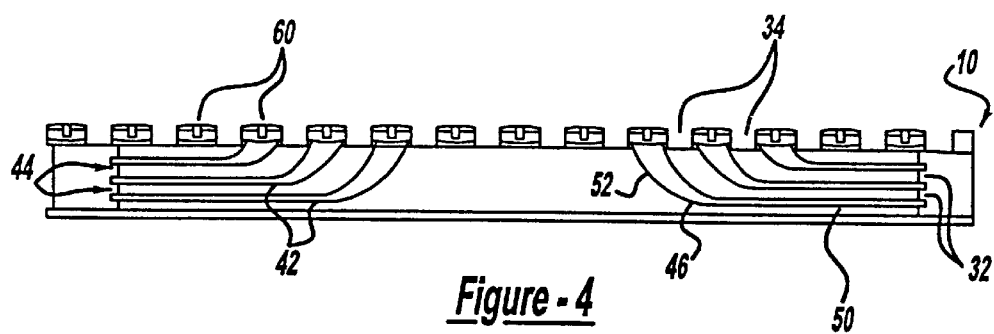
FIG. 4 is a front view of the first preferred embodiment of the fiber optic cable routing device of the present invention.

The fiber cable routing device 10 is comprised of a faceplate 40 and at least one set of spaced apart separating members 42 which extend outwardly from the faceplate 40 as best seen in FIGS. 3 and 4. The plurality of separating members 42 define a plurality of channels 44 therebetween for routing fiber optic cable towards the circuit packs, such that each channel provides a minimum bend radius 46 to protect the fiber optic cable extending therethrough. In a preferred embodiment, the fiber optic cable routing device 10 further includes a second set of separating members which extend outwardly from the faceplate, thereby defining a second set of channels for routing fiber optic cable. In any case, the number of channels provided by the cable routing device preferably corresponds to the number of circuit packs connectable in the equipment bay. It should also be appreciated that each channel is sized to accommodate a plurality of fiber optic cables.

Each channel generally enables at least a 45 degree change in direction for the fiber optic cable extending therethrough. To do so, each separating member 42 includes a substantially flat section 50 and an arcuate section 52 cooperatively defining at least one surface for routing fiber optic cable therealong. The arcuate section 52 of the separating member maintains a radius which is not less than the minimum bend radius for the fiber optic cable. As will be apparent to one skilled in the art, fiber optic cable bent beyond the minimum bend radius can impair the performance of the fiber optics therein. Although the minimum bend radius will vary depending on the specific type of fiber optic cable and its application, a generally accepted rule is that the minimum bend radius should not be less than ten times the outer diameter of the fiber optic cable. For example, a 5 mm cable should not have any bends less than 50 mm in radius. It should be appreciated that the radius of an arcuate section may vary for each of the separating members in the cable routing device. One skilled in the art will readily recognize from such discussion how to implement a minimum bend radius for each of the channels in the fiber optic cable routing device.

Referring back to FIG. 1, fiber optic cable 18 may be routed to the fiber optic connection unit 10 from an external cable source (not shown). In this case, the fiber optic cables 18 extend along either of the frame members 14. It is envisioned that the fiber optic connection unit 12 may employ various types of brackets, troughs or other well known types of cable management techniques to facilitate the routing of fiber optic cable along the periphery of the unit.

In accordance with the present invention, the fiber optic cable routing device 10 directs the fiber optic cable 18 towards the circuit packs 22. In a preferred embodiment, a recess 30 is provided in a side wall of the shelf. The fiber optic cable 18 extending along an adjacent frame member is routed via the recess 30 into the cable routing device 10. Each of the channels formed in the cable routing device 10 includes an entrance opening 32 and an exit opening 34. The entrance openings 32 generally align with the recess 30 to receive the fiber optic cables 18. In other words, each of the entrance openings 32 is orientated substantially perpendicular to the adjacent frame member 14. Conversely, each of the exit openings 34 is orientated towards the circuit packs 22. More specifically, each exit opening 34 aligns with a corresponding slot for a circuit pack as provided by the shelf. In this way, each channel enables a substantially 90 degree change in direction for the fiber optic cable extending therethrough. Moreover, each channel in the cable routing device preferably supports fiber optic cable for single circuit pack.

Figure 5:
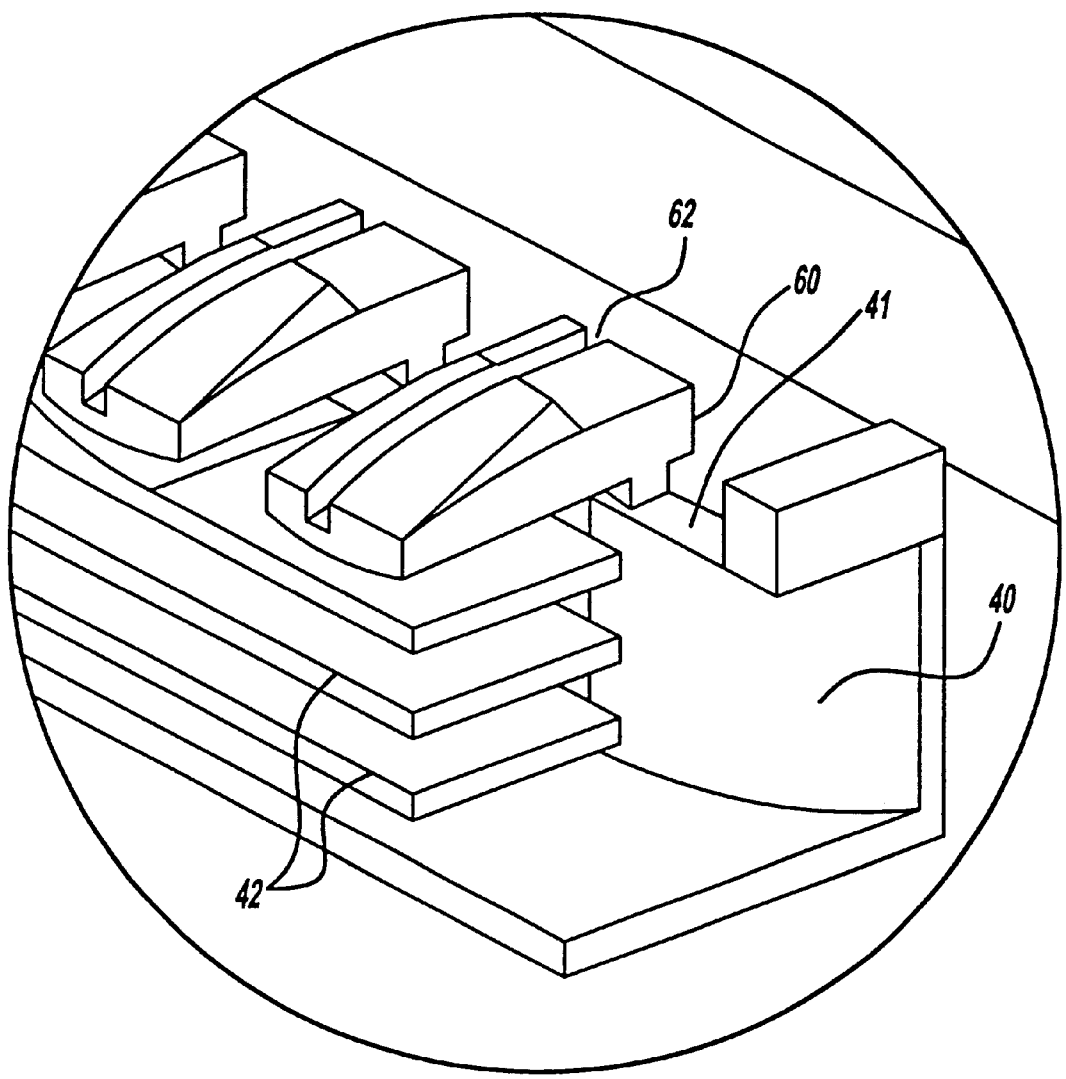
FIG. 5 is a fragmentary prospective view of the first preferred embodiment of the fiber optic cable routing device of the present invention.

In another aspect of the present invention, the fiber optic cable routing device 10 further includes a plurality of guide protrusions 60 for pre-aligning each of the circuit packs 22 with a corresponding slot in the support rack 20. In a preferred embodiment, the guide protrusions 60 extends outwardly from a top edge 41 of the faceplate 40 of the cable routing device 10 and is adapted to engage a bottom portion of at least one circuit pack. More specifically, each guide protrusion 60 includes a guide slot 62 coaxially defined therein for engaging a circuit pack as best seen in FIG. 5. In addition, the guide slot 62 axially aligns with a corresponding lower guide member in the support rack 20. It is understood that the number of guide protrusions 60 preferably corresponds to the number of circuit packs connectable to the support structure.

In operation, a given circuit pack slides into one of the slots provided by the support rack. In this case, the bottom portion of the circuit pack is set into guide slot of a given guide protrusion. Since the guide slot axially aligns with the lower guide member of a corresponding slot, the circuit pack is easily slide into the slot of the support structure. In this way, the guide protrusions facilitate the insertion of circuit packs into the fiber optic connection unit. It should be appreciated that this aspect of the present invention is not limited to a cable routing device for fiber optic cables, but can be employed on any type of cable routing device which is positioned adjacent to circuit packs or other slidably installed communication modules.

While the invention has been described in its presently preferred form, it will be understood that the invention is capable of modification without departing from the spirit of the invention as set forth in the appended claims.

What is claimed is:

1. A fiber optic connection unit, comprising;
a pair of longitudinally extending and spaced apart frame members;
at least one connector module having a fiber optic cable connector and mounted between the pair of frame members; and
a fiber optic cable routing device disposed adjacent to the connector module and mounted to the pair of frame members, the cable routing device having a faceplate and a first set of spaced apart separating members extending outwardly from the faceplate and defining a first set of channels therebetween for routing fiber optic cables, such that each channel enables at least a 45 degree change in direction for the fiber optic cables extending therethrough, wherein each separating member further includes a substantially flat section and an arcuate section cooperatively defining a surface for the routing fiber optic cables, such that the arcuate section of the separating member provides a minimum bend radius to protect the fiber optic cable.

2. The fiber optic connection unit of claim 1 wherein the first set of separating members further defines an entrance opening for each channel, such that each entrance opening is orientated towards one of the frame members, and an exit opening for each channel, such that each exit opening is orientated towards the connector module.

3. The fiber optic connection unit of claim 1 wherein the minimum bend radius is further defined to be greater than ten times an outer diameter of a fiber optic cable extending along the surface of the separating member.

4. The fiber optic connection unit of claim 1 wherein the surface of each separating member enables a substantially 90 degree change in direction for the fiber optic cables extending therealong.

5. The fiber optic connection unit of claim 2 further comprising a second set of spaced apart separating members extending outwardly from the faceplate and defining a second set of channels therebetween for the routing fiber optic cables, the second set of separating members having an entrance opening for each channel that is orientated towards the other of the two frame members and an exit opening for each channel orientated towards the connector module.

6. A fiber optic connection unit, comprising;
- a pair of longitudinally extending and spaced apart frame members;
- a support structure mounted between the pair of frame members and adapted for connection to a plurality of circuit packs, where the support structure defines a plurality of slots for housing the plurality of circuit packs;
- at least one vertically oriented circuit pack connected to the support structure; and
- a fiber optic cable routing device disposed below the plurality of circuit packs and mounted to the support structure, the cable routing device having a faceplate and a plurality of spaced apart separating members extending outwardly from the faceplate and defining a plurality of channels therebetween for routing fiber optic cables towards the circuit packs, such that each channel enables at least a 45 degree change in direction for the fiber optic cables extending therethrough, the fiber optic cable routing device further includes a plurality of guide protrusions for pre-aligning each of the circuit packs into a corresponding slot in the support structure.

7. The fiber optic connection unit of claim 6 wherein the plurality of channels for the routing fiber optic cables corresponds to the number of circuit packs connectable to the support structure.

8. A fiber optic connection unit of claim 6 wherein the plurality of separating members further defines an entrance opening and an exit opening for each channel, such that each entrance opening is orientated towards one of the frame members and each exit opening is orientated towards the support structure.

9. The fiber optic connection unit of claim 8 wherein the support structure includes a plurality of slots for housing the plurality of circuit packs, such that each exit opening is orientated towards a corresponding slot in the support structure.

10. The fiber optic connection unit of claim 6 wherein each separating member further includes a substantially flat section and an arcuate section cooperatively defining a surface for the routing fiber optic cables, such that the arcuate section of the separating member provides a minimum bend radius to protect the fiber optic cable.

11. The fiber optic connection unit of claim 10 wherein the minimum bend radius is further defined to be greater than ten times an outer diameter of a fiber optic cable extending along the surface of the separating member.

12. The fiber optic connection unit of claim 7 wherein the number of said guide protrusions corresponds to the number of circuit packs connectable to the support structure.

13. The fiber optic connection unit of claim 7 wherein each of the guide protrusions extends outwardly from a top edge of the fiber cable routing device and is adapted to engage at least one circuit pack.

14. The fiber optic connection unit of claim 7 wherein each guide protrusion further includes a guide slot coaxially defined therein for engaging at least one pack.

15. The fiber optic connection unit of claim 7 wherein each slot in the support structure provides a guide member for engaging at least one circuit pack and each guide protrusion axially aligns with a corresponding guide member in the support structure.

16. A telecommunication connection unit, comprising;
- a pair of longitudinally extending and spaced apart frame members;
- a support structure mounted between the pair of frame members, the support structure having a plurality of slots for housing a plurality of circuit packs; and
- a cable routing device disposed below the at least one circuit pack and mounted to the support structure for routing a communication cable towards the circuit packs, the cable routing device having one or more guide protrusions for pre-aligning a circuit pack into a corresponding slot in the support structure.

17. The telecommunication connection unit of claim 16 wherein the number of said guide protrusions corresponds to the number of circuit packs connectable to the support structure.

18. The telecommunication connection unit of claim 16 wherein each of the guide protrusions extending outwardly from the cable routing device and are adapted to engage at least one circuit pack.

19. The telecommunications connection unit of claim 16 wherein each guide protrusion further includes a guide slot coaxially defined therein for engaging at least one circuit pack.

20. The telecommunications connection unit of claim 16 wherein each slot in the support structure provides a guide member for engaging at least one circuit pack and each guide protrusion axially aligns with a corresponding guide member in the support structure.

21. The telecommunications connection unit of claim 16 wherein the cable routing device includes a faceplate and a plurality of spaced apart separating members extending outwardly from the faceplate, thereby defining a plurality of channels therebetween for routing communication cable towards the circuit packs.

22. The telecommunications connection unit of claim 21 wherein the plurality of channels for routing the communication cable corresponds to the number of circuit packs connectable to the support structure.

23. The telecommunications connection unit of claim 21 wherein the plurality of channels maintains a minimum bend radius for protecting the communication cable extending therethrough.

* * * * *